R.E. 25126

May 16, 1961  L. L. CHARLSON  2,984,215
CONTROLLER FOR FLUID PRESSURE OPERATED DEVICES
Filed Nov. 25, 1958  4 Sheets-Sheet 1

INVENTOR.
LYNN L. CHARLSON
BY
*Merchant & Merchant*
ATTORNEYS

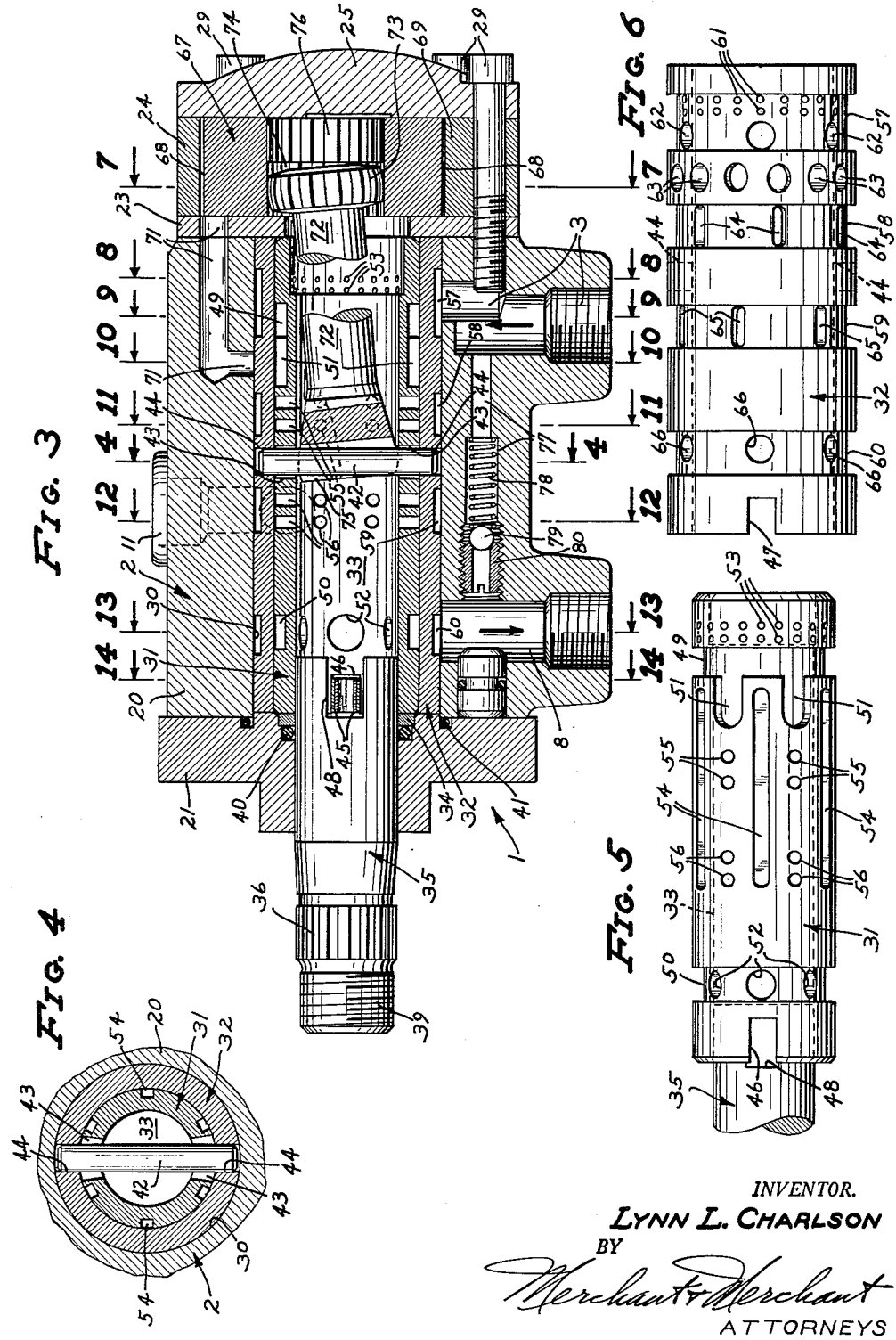

May 16, 1961 L. L. CHARLSON 2,984,215
CONTROLLER FOR FLUID PRESSURE OPERATED DEVICES
Filed Nov. 25, 1958 4 Sheets-Sheet 3

INVENTOR.
LYNN L. CHARLSON
BY
Merchant & Merchant
ATTORNEYS

INVENTOR.
LYNN L. CHARLSON
BY
ATTORNEYS

United States Patent Office 2,984,215
Patented May 16, 1961

2,984,215
CONTROLLER FOR FLUID PRESSURE OPERATED DEVICES

Lynn L. Charlson, Minneapolis, Minn., assignor to Germane Corporation, Minneapolis, Minn., a corporation of Minnesota Filed Nov. 25, 1958, Ser. No. 776,281

12 Claims. (Cl. 121—41)

My invention relates generally to control apparatus for fluid pressure operated devices and more particularly to fluid valve structures for controlling actuation of devices which are operated by fluid under pressure.

An important object of my invention is the provision of a novel valve structure including a movable valve element whereby the amount of movement of a movable fluid pressure operated member in a given direction is dependent on the amount of movement of said movable valve element in a given direction.

Another object of my invention is the provision of a control valve having novel follow-up mechanism which is responsive only to flow of a given quantity of fluid through said control valve to close the valve, thus eliminating the necessity for mechanical linkage between the valve and the fluid pressure operated device controlled thereby. To this end I provide a valve having a primary valve element under control of an operator, a movable follow-up valve element, and a servomotor connected to the follow-up element, the valve structure having passage means whereby all of the fluid under pressure flowing between a source and said fluid-pressure operated device, through said valve, is conducted through said servomotor to operate the same to move the follow-up element in a direction to stop the fluid flow to said device.

Another important object of my invention is the provision of a novel control apparatus as set forth, having novel means whereby the servomotor can be operated by the operator, in the absence of failure of said source to provide fluid under pressure, so that the servomotor operates as a pump to deliver the desired quantity of fluid under pressure to said fluid-pressure operated device.

Still another object of my invention is the provision of control apparatus of the above type which can be easily installed in fluid pressure systems involving different types of fluid-pressure operated devices to control operation thereof in opposite directions, and being located at remote points from said devices, if desired.

The above, and still further highly important objects and advantages of my invention will become apparent from the following detailed specification, appended claims, and attached drawings.

Referring to the drawings, which illustrate the invention, and in which like reference characters indicate like parts throughout the several views:

Fig. 3 is an axial section taken substantially on the line 3—3 of Fig. 2;

Fig. 4 is a transverse section taken substantially on the line 4—4 of Fig. 3, some parts being broken away;

Fig. 5 is a fragmentary view in side elevation of one of the valve elements of my invention;

Fig. 6 is a view in side elevation of the follow-up valve element of my invention.

Figure 1:
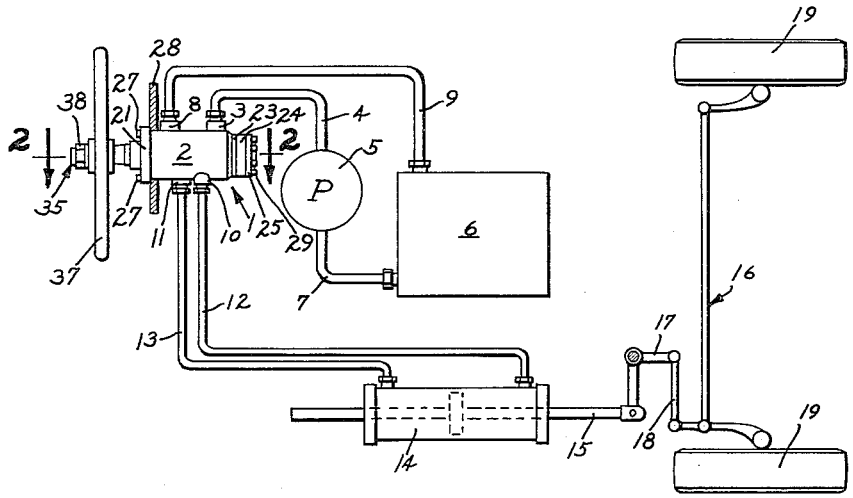
Fig. 1 is a diagram showing my novel controller as used in the power steering system of a vehicle.

In the preferred embodiment of the invention illustrated, my novel controller is indicated in its entirety by the numeral 1, and, for the purpose of the present example, is illustrated in Fig. 1 as used in the power steering mechanism for a vehicle. The controller 1 involves a casing or body structure 2 having an inlet 3 to which is connected a conduit 4 through which fluid under pressure is introduced to the controller 1 from a suitable source, such as a pump 5 that is connected to a reservoir or tank 6 by a conduit 7. The casing 2 is further provided with an outlet 8 for return of fluid to the tank or reservoir 6 through a conduit 9 suitably connected to the outlet 8. The casing 2 is further provided with a pair of ports 10 and 11 to which respective conduits 12 and 13 are connected, these conduits leading to opposite ends of a fluid pressure cylinder 14 having mounted for axial reciprocatory movement therein a piston-equipped plunger rod 15. Said plunger rod 15 is connected to the steering linkage 16 of the vehicle, not shown, by means of the usual bell crank 17 and rigid link 18. The steering linkage 16 is connected to the steerable wheels 19 in the usual manner.

Figure 14:
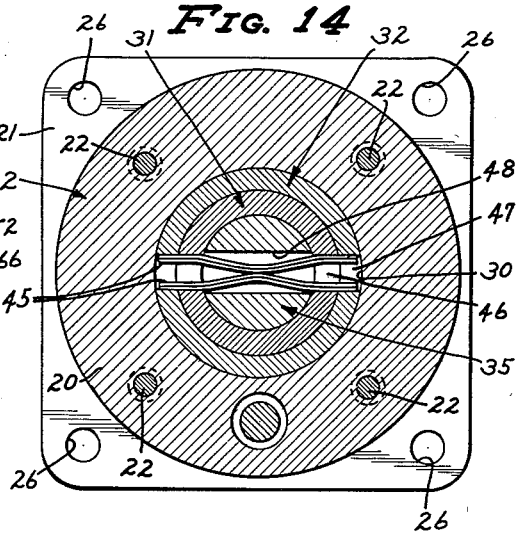

The casing or body structure 2 comprises a tubular casing section 20 which defines the inlet and outlet 3 and 8 respectively and the ports 10 and 11, a mounting flange 21 that is rigidly secured to one end of the tubular section 20 by machine screws or the like 22, see Fig. 14, a bearing plate 23, an internally toothed member 24, and an end cap 25. With further reference to Fig. 14, it will be seen that the mounting flange 21 is provided with circumferentially spaced apertures 26 for the reception of mounting bolts or the like 27, by means of which the controller 1 may be mounted on a suitable wall or mounting bracket 28 of the vehicle, as shown, see Fig. 1. With reference to Fig. 3 it will be seen that the bearing plate 23, internally toothed member 24, and end cap 25 are rigidly secured in end to end relationship to the opposite end of the tubular housing section 20 by means of machine screws 29.

Figure 2:
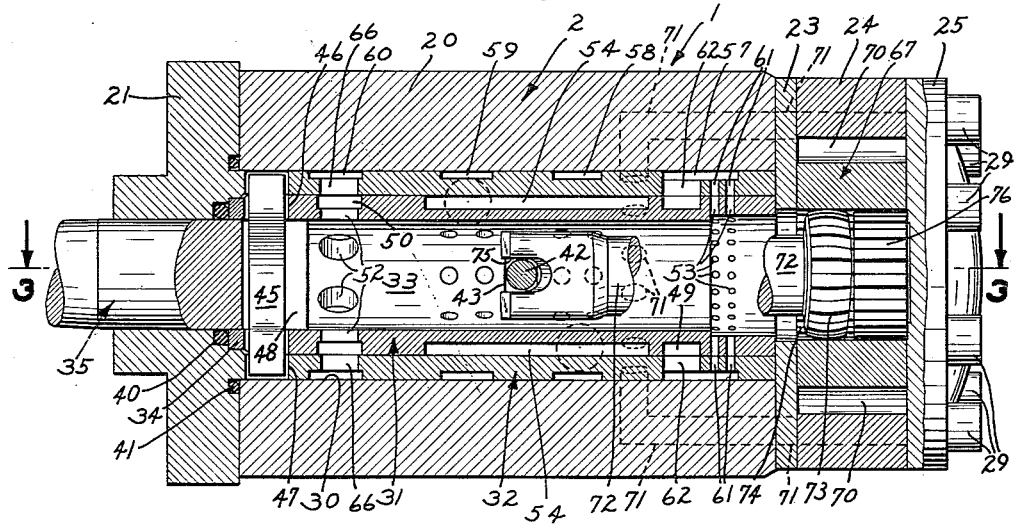
Fig. 2 is an enlarged view partly in elevation and partly in axial section taken substantially on the line 2—2 of Fig. 1, some parts being broken away.

The tubular housing or casing section 20 has an internal cylindrical wall 30 which, together with the mounting flange 21 and annular bearing plate 23, defines a cylindrical chamber for the reception of concentric primary and follow-up valve elements 31 and 32 respectively. The follow-up valve element 32 is in the nature of a tubular sleeve which closely engages the inner cylindrical wall 30 for rotary movement with respect to the casing section 20 and concentric therewith, the opposite ends of the follow-up valve element 32 having substantially abutting engagement with an inner surface portion of the mounting flange 21 and with the bearing plate 23. The primary valve element 31 is cylindrical in form and hollow for the greater part of its length whereby to define an axial recess or passage 33 which extends inwardly from the end thereof adjacent the bearing plate 23, the valve element 31 being nestingly received within the follow-up valve element 32 and concentric therewith. One end of the primary valve element 31 is in substantially abutting relationship with the bearing plate 23, the opposite end of the valve element 31 having abutting engagement with a thrust bearing 34 mounted in the mounting flange 21. The inner end of the axial recess 33 is defined by the inner end of a control shaft 35 which extends axially outwardly from the adjacent end of the primary valve element 31, and which is journalled in the mounting flange 21, the outer end portion of the control shaft 35 being splined or otherwise arranged as indicated at 36, for reception thereon of a suitable control element such as a steering wheel or the like 37 that is held in place by a nut 38 threaded on the screw threaded end 39 of the shaft 35. With reference to Figs. 2 and 3, it will be seen that an O-ring 40 is contained in a suitable annular groove in the mounting flange 21 and encircles the shaft 35 adjacent the thrust bearing 34 to prevent leakage of fluid from within the housing or body structure 2 adjacent the shaft 35. A second O-ring 41 is mounted in the mounting flange 21 and provides a seal between the mounting flange 21 and the tubular body section 20.

The primary valve element 31 is coupled to the follow-up valve element 32 for limited rotary movement in opposite directions with respect to the follow-up valve element 32, and for common rotary movement with the follow-up valve element 32. Means for thus coupling the valve elements together comprises a transverse drive pin 42 which extends radially through a pair of diametrically opposed circumferentially extended slots 43 in the primary valve element 31, see particularly Fig. 4, the opposite ends of the drive pin 42 being snugly received in diametrically opposed apertures 44 in the follow-up valve element 32. When the primary valve element 31 is rotated in either direction from its neutral position shown in Fig. 4, the drive pin 42 becomes engaged by the opposite ends of the opposed slots 43, after which the continued rotary movement of the primary valve element 31 will cause similar rotary movement to be imparted to the follow-up valve element 32. For the purpose of yieldingly urging the valve elements 31 and 32 toward a neutral relationship wherein the drive pin 42 is centered in the slots 43, I provide a plurality of resilient leaf springs 45 which extend radially through aligned diametrically opposed notches 46 and 47 in the primary and follow-up valve elements 31 and 32 respectively, and through a groove or channel 48 in the inner end of the control shaft 35 and aligned with the notches 46 and 47. Preferably, the primary valve element 31 and control shaft 35 are fabricated separately, the inner grooved end of the shaft 35 being welded or otherwise rigidly secured within the adjacent end portion of the tubular section of the valve element 31.

The primary valve element 31 is formed to provide, in axially inwardly spaced relation to its opposite ends, a pair of radially outwardly opening circumferential channels 49 and 50, one side of the former defining axially inwardly extending radially outwardly opening recesses 51 in circumferentially spaced relationship. The channel 50 communicates with the recess or passage 33 by means of a plurality of circumferentially spaced radial passages or openings 52. At its end portion adjacent the channel 49, the valve element 31 defines a pair of axially spaced circumferentially extending rows of radial apertures or passages 53 which extend inwardly from the outer surface of the primary valve element 31 and communicate with the interior recess or passage 33 thereof. Intermediate the channels 49 and 50, the outer surface of the primary valve element 31 is formed to provide a plurality of circumferentially spaced radially outwardly opening passages in the nature of grooves 54 which extend axially of the primary valve element 31, the grooves 54 terminate at one end between adjacent recesses 51 and in circumferentially spaced relation thereto, and at their other end terminating in axially spaced relation to the channel 50. Intermediate the grooves 54, the valve element 31 is provided with pairs of radial openings 55 and 56 which communicate with the passage or recess 33, the radial openings 55 being located in closely spaced relation to adjacent recesses 51, and the openings 56 being disposed adjacent the opposite ends of the grooves 54, see particularly Fig. 5. It will be noted that axially aligned pairs of the openings 55 and 56 are also disposed in axial alignment with a different one of the recesses 51, for a purpose which will hereinafter become apparent.

Figure 10:
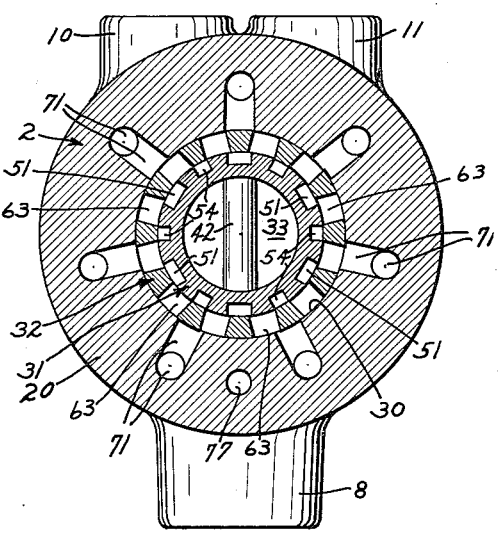
Figure 11:
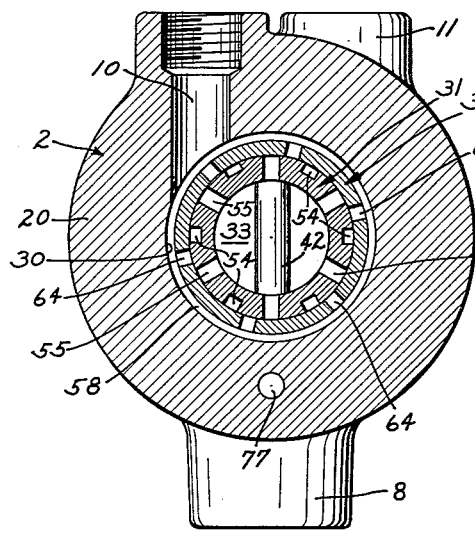
Figure 12:
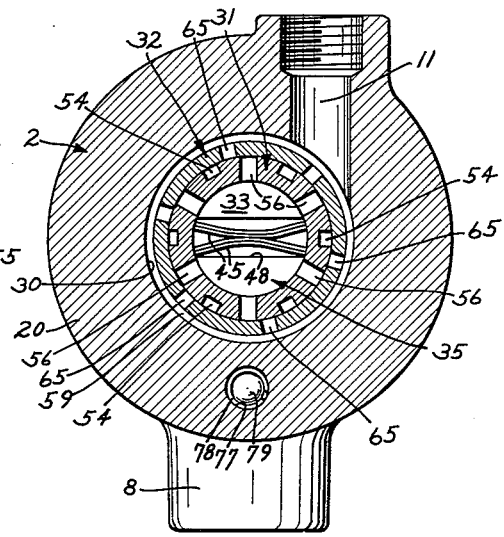
Figure 13:
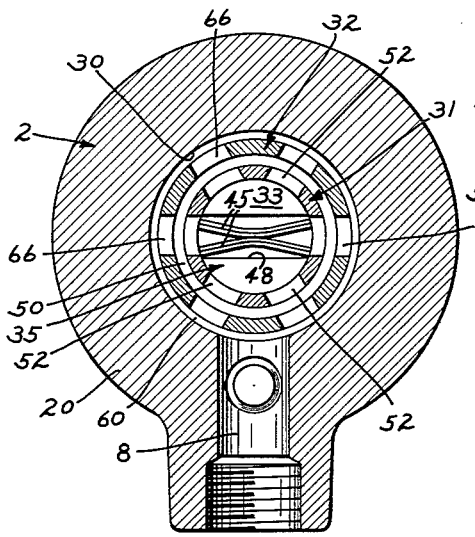

The outer cylindrical surface of the follow-up valve element 32 is formed to provide a plurality of axially spaced radially outwardly opening circumferential channels 57, 58, 59 and 60, see particularly Fig. 6. The several channels 57–60 are disposed in registration with respective ones of the openings in the tubular casing 20, the channel 57 being in registration with the inlet 3, the channel 58 with the delivery port 10, the channel 59 with the delivery port 11, and the channel 60 with the outlet 8. A pair of axially spaced circumferentially extended rows of apertures or passages 61 extend radially inwardly of the channel 57 to the interior of the follow-up valve element 32, each of the apertures 61 being in register with a different one of the apertures 53 in the primary valve element 31 when the primary valve element 31 is in its neutral position relative to the follow-up valve element 32, wherein the drive pin 42 is centered in the slots 43. Also extending radially inwardly from the bottom of the channel 57 is a plurality of circumferentially spaced openings or passages 62 that are in constant communication with the channel 49 of the primary valve element 31, whereby fluid under pressure is supplied by the pump 5 to the channel 49 and recesses 51 at all times and irrespective of the relative positions of the valve elements 31 and 32. A plurality of circumferentially spaced radial passages 63 extend inwardly from the outer surface of the follow-up valve element 32 intermediate the channels 57 and 58 thereof, there being a like number of radial passages 63 as that of recesses 51 and axial grooves 54 combined. As shown best in Fig. 10, the row of radial passages 63 overlies the recesses 51 and adjacent end portions of the grooves 54.

The follow-up valve element 32 is formed to provide a plurality of slot-like passages 64 which extend radially inwardly from the channel 58 and which are disposed to register selectively with the openings 55 and grooves 54 of the primary valve element 31 upon relative rotation between the valve elements 31 and 32. The slot-like passages 64 are equal in number to one-half of the radial passages 63, the passages 64 being aligned with alternate ones of the radial passages 63 axially of the valve element 32, as best shown in Fig. 6. Similar slot-like passages 65 extend radially inwardly from the bottom of the channel 59 in circumferentially staggered relationship to the passages 64, the passages 65 being aligned with alternate ones of the radial passages 63 axially of the follow-up valve element 32. The slot-like passages 65 are adapted to register selectively with the openings 56 and the adjacent end portions of the grooves 54, in the primary valve element 31, upon relative rotation between the valve elements 31 and 32. The channel 60 of the follow-up valve element 32 is disposed in overlying relationship to the channel 50 of the primary valve element 31, and communication is had between the channels 60 and 50 by a plurality of circumferentially spaced radial passages 66 extending inwardly from the bottom of the channel 60. With this arrangement, when the valve elements 32 and 32 are in their relative neutral positions, with the apertures 61 and 53 in registration, fluid entering through the inlet 3 flows inwardly through the aligned passages 61 and 53 to the recess or passage 33, and from thence outwardly through the passages 52, channel 50, passage 66 and channel 60 to the outlet 8, and from thence to the reservoir 6 through the conduit 9. It will be noted that the recess or passage 33 is in constant communication with the outlet 8 through the channels 50 and 60 and their respective passages 52 and 66.

Figure 7:
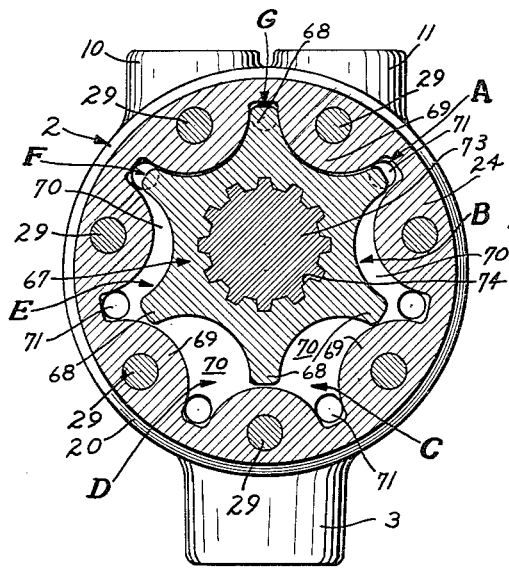
Figs. 7–14 are views in transverse section taken respectively on the lines 7—7, 8—8, 9—9, 10—10, 11—11, 12—12, 13—13, and 14—14 of Fig. 3.
Figure 8:
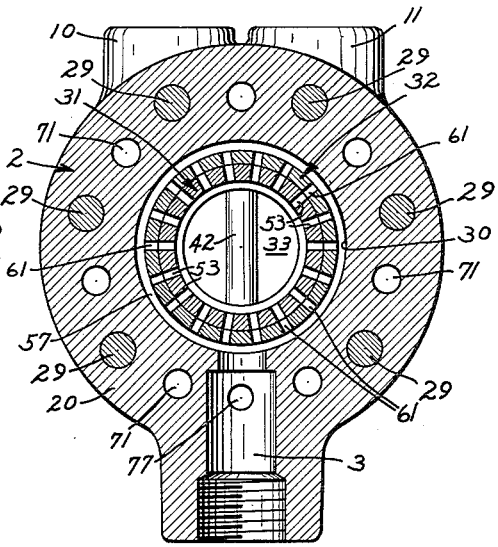
Figure 9:
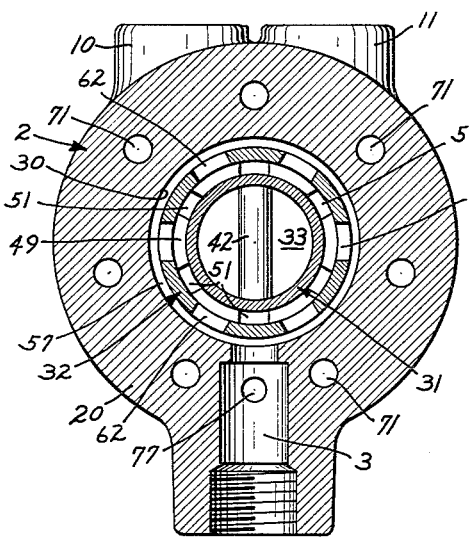

The internally toothed member 24 comprises the stator of a fluid pressure operated servomotor which also includes an externally toothed member 67 having a less number of teeth 68 than that of the teeth 69 defined by the stator or internally toothed member 24, said member 67 being adapted to rotate on its own axis and partake of orbital movement about the axis of the member 24. The members 24 and 67 are so arranged that the teeth 68 and and 69 thereof respectively move into and out of intermeshing engagement and define expanding and contracting fluid chamber 70, see Fig. 7, during said rotary and orbital movement of the member 67. The construction of the members 24 and 67 is similar to that shown and described in my prior U.S. Letters Patent 2,821,171, and the operation thereof is fully disclosed in said prior Letters Patent. By introducing fluid under pressure to some of the chambers 70 and permitting fluid to escape from others thereof, the externally toothed member or rotor 67 partakes of an orbital movement about the axis of the internally toothed member 24. Inasmuch as there are seven stator teeth 69 and six rotor teeth 68, the externally toothed member or rotor will rotate once on its own axis during six cycles of orbital movement thereof about the axis of the internally toothed member or stator 24.

The casing structure 2 is provided with a plurality of circumferentially spaced axially extending fluid passages 71 that extend through the bearing plate 23 one each into a different one of the chambers 70 between the root portions of adjacent internal teeth 69. At their inner ends, the fluid passages 71 extend radially inwardly through the inner cylindrical wall 30 of the tubular casing section 20 radially outwardly of the row of radial passages 63.

The externally toothed member or rotor 67 is operatively coupled to the follow-up valve element 32 by means of an angularly disposed drive shaft 72 which at its outer end is provided with a splined head 73 that is mounted in a central splined opening 74 in the rotor 67. With reference to Figs. 2 and 3, it will be seen that the splined head 73 is rounded to permit angular movements of the shaft 72 relative to the externally toothed rotor member 67. At its opposite end, the drive shaft 72 is bifurcated, as indicated at 75, to receive the central portion of the drive pin 42, whereby rotation of the externally toothed member or rotor 67 is imparted to the follow-up valve element 32. Axial movement of the drive shaft 72 is limited in one direction by engagement of the splined head 73 with the annular bearing plate 23, and in the other direction by engagement of the outer end of the splined head 73 with a stop plug or the like 76 contained in the splined opening 74 of the externally toothed member 67 between the head 73 and the end cap 25.

For a purpose hereinafter to be described, I provide a fluid passage 77 in the tubular casing section 20, said passage 77 communicating at its opposite ends with the inlet 3 and the outlet 8, see Fig. 3. At its intermediate portion, the passage 77 is enlarged to receive a coil compression spring 78 which exerts yielding bias against a ball check valve 79 toward seating engagement with an annular valve seat 80 that is screw threaded into a further enlarged threaded portion of the passage 77 adjacent the outlet 8. This arrangement provides for flow of fluid from the outlet 8 to the inlet 3 when fluid pressure is greater in the outlet 8 than in the inlet 3.

As hereinbefore stated, when the primary valve element 31 is in its neutral position relative to the follow-up valve element 32, fluid under pressure from the pump 5 flows through the conduit 4, inlet 3, channel 57, radially inwardly through the aligned apertures 61 and 53, through the recess 33, channel 50, outwardly through the openings or passages 52 and passages 66, and channel 60 to the outlet 8, and from thence to the reservoir 6 through the conduit 9. In this neutral position of the valve element 31, it will be noted that both the grooves 54 and the openings or passages 55 and 56 are out of registration with the slot-like passages 64 and 65 so that there is no flow of fluid either to or from the cylinder 14, thus providing a fluid lock for the piston equipped plunger 15. As soon as the control or steering wheel 37 is rotated in one direction such as, for instance, a clockwise direction with respect to Figs. 4 and 7–14, the apertures 53 will be moved out of registration with their corresponding apertures 61 and the groove 54 will be moved into registration with the corresponding pairs of the slot-like passages 65, while the pairs of openings 55 will move into registration with the slot-like passages 64. Fluid under pressure will then flow inwardly through the radial openings or passages 62 into the channel 49 and recesses 51 and outwardly from thence through passages 63 in registry with the recesses 51, through the fluid passages 71 which are in register with said registering passages 63 to certain ones of the chambers 70, such as the chambers indicated at A and B in Fig. 7, to impart orbital movement to the externally toothed member 67, in a counterclockwise direction with respect to Fig. 7. This orbital movement causes contraction of others of the chambers 70, such as the chambers indicated at E and F in Fig. 7, fluid moving outwardly from thence to others of the passages 71 and radially inwardly through the radial passages 63 in register therewith and with the grooves 54. With the externally toothed member 67 positioned as in Fig. 7, the passages 71 leading from the chambers indicated at C, D and G are out of register with their cooperating radial passages 63. As the follow up valve element 32 rotates in common with the externally toothed member 67, the chambers D and C will become successively contracting chambers operatively connected to the grooves 54, while the chambers G and F become successively expanding chambers operatively connected to the recesses 51. The grooves 54 being in register with the slot-like passages 65, fluid from the contracting chambers 70 flows to the grooves 54 as immediately above described, outwardly through the passages 65, through the channel 59 in register with the port 11, through the port 11 and conduit 13 to one end of the cylinder 14 to impart movement to the piston equipped plunger rod 15 in a direction from the left to the right with respect to Fig. 1. This movement of the plunger rod 15 causes fluid to flow from the opposite end of the cylinder 14 through the conduit 12 to the port 10, inwardly through the slotlike passages 64 and openings 55 in register therewith to the recess or passage 33, and from thence outwardly through the openings 52 and 66 to the outlet 8 to be discharged through the conduit 9 into the reservoir 6.

It will be appreciated that, during the counterclockwise orbital movement of the externally toothed member 67, the same is rotating in a clockwise direction similar to the initial direction of movement of the primary valve element 31 to rotate the follow-up valve element 32 toward a neutral position with respect to the primary valve element 31, the amount of common rotation of the follow-up externally toothed member 67 and the valve element 32 being only one-sixth of a complete revolution for each cycle of orbital movement of the externally toothed member 67. It will be further appreciated that the follow-up valve element 32 operates in the nature of a commutator to position given ones of the radial passages 63 with given recesses 51, grooves 54 and the passages 71 to direct the fluid in a manner to cause continued orbital movement of the externally toothed member 67 until rotation of the same has moved the follow-up valve element 32 into its neutral position with respect to the primary valve element 31. Obviously, the primary valve element 31 may continue to be manually rotated by means of the steering wheel 37 as far as desired, the servomotor comprising the toothed members 24 and 67 continuing to operate until neutrality is obtained between the primary valve element 31 and follow-up valve element 32.

Rotary movement imparted to the primary valve element 31 in a counterclockwise direction with respect to Figs. 4 and 7–14 causes the longitudinal grooves 54 to come into register with the slot-like passages 64 and the openings 56 to be registered with the slot-like passages 65. Fluid under pressure is then delivered from the servomotor to the port 10 and from thence to said opposite end of the cylinder 14 through the conduit 12, return fluid being directed from said one end of the cylinder 14 through the conduit 13 to the port 11, through the aligned openings 65 and 56 to the recess or passage 33, and from thence to the reservoir 6 through the outlet 8 and conduit 9. Thus it will be seen that rotation of the control wheel 37 causes the steerable wheels 19 to be swung in one direction, while rotation of the control wheel 37 in the opposite direction causes the steerable wheels 19 to partake of steering movements accordingly.

The yielding bias exerted by the leaf springs 45 against rotary movement of the primary valve element 31 with respect to the follow-up valve element 32, is such that a nominal amount of steering effort by the operator is required to rotate the wheel 37 in either direction from the neutral position above described. Due to the yielding bias of the leaf springs 45, release of the control wheel 37 by the operator will cause the primary valve element 31 to be immediately returned to its neutral position by the springs 45 to shut off flow of fluid to either end of the fluid pressure operated device or cylinder 14.

In view of the fact that all fluid delivered to either end of the cylinder 14 passes through the servomotor, the servomotor may be used as a pump, operated by manually rotating the control wheen 37 in either direction, to deliver fluid under pressure to a selected end of the cylinder 14, upon failure of the pump 5 to deliver fluid under pressure to the inlet 3. In the event of such pump failure, initial manual rotation of the control wheel 37 will cause the primary valve element 31 to be rotated until opposite given ends of the slots 43 engage the drive pin 42 at which point the longitudinal grooves 54 are in registration with the desired slot-like passages 64 or 65 in the follow-up valve element 32. Further rotation of the control wheel 37 will cause the drive shaft 72 to rotate the externally toothed member 67 about its own axis whereby to partake of orbital movements within the internally toothed member 24 and about the axis of said internally toothed member 24. Thus, fluid is directed under pressure to the desired end of the cylinder 14, and the fluid returning from the opposite end thereof to the valve structure will set up a pressure in the outlet 8 greater than that within the inlet 3 to cause movement of said ball check valve 79 to an open position against yielding bias of the spring 78, to supply the inlet with fluid to be drawn into the servomotor now acting as a pump. Obviously, the effort required to rotate the control wheel 37 upon such failure of the pump 5, is appreciably greater than than required when the pump 5 is in operation. However, the above described arrangement eliminates the necessity for any mechanical linkage between the control wheel 37 and the steering apparatus and permits my novel controller to be situated at any desired point on a vehicle or any other machine requiring its use.

While I have shown my novel controller as being utilized in the power steering equipment of a vehicle, it will be appreciated that the same may be advantageously used to control fluid pressure operated apparatus in various machines wherein movement of movable devices utilizing fluid pressure operated motors requires control of the extent of movement of the movable devices.

While I have shown and described a commercial embodiment of my novel control apparatus, it will be understood that the same is capable of modification without departure from the spirit and the scope of the invention, as defined in the claims.

What I claim is:

1. A controller for fluid pressure operated devices, said controller comprising; valve structure including a primary movable valve element and a cooperating movable follow-up valve element; means for connecting said primary valve element to a control element for common movement therewith; means coupling said primary valve element to said follow-up valve element for limited movements independently of said follow-up valve element and for common movements therewith; and a fluid servomotor including a movable member coupled to said follow-up valve element for imparting follow-up movements thereto responsive to movement of said movable member; said valve structure defining, an inlet for connection to a source of fluid under pressure and an outlet for return of fluid to said source, a pair of fluid ports for connection to a fluid pressure operated device, and fluid passages communicating with said servomotor; said valve elements each having valve passages which cooperate to direct flow of fluid from said inlet through said servomotor to one of said ports and to direct flow of fluid from the other of said ports to said outlet responsive to movement of said primary valve element in one direction away from a neutral position relative to said follow-up valve element; movement of said primary valve element in the opposite direction from said neutral position causing said valve element passages to be disposed to direct flow of fluid from said inlet through said servomotor to the other of said ports and to direct the flow of fluid from said one of the ports to said outlet; the arrangement being such that the entire stream of fluid flowing from said inlet to the selected one of said ports is conducted through said servomotor; said valve elements in said neutral position relative to each other cutting off the flow of fluid to said servomotor.

2. The structure defined in claim 1 in which said valve structure further defines an auxiliary fluid passage between said inlet and said outlet independently of the others of said passages; and in further combination with a valve normally closing said auxiliary passage when the inlet pressure is greater than the outlet pressure and opening said auxiliary passage during reversal of said pressure to permit flow of fluid from said outlet to said inlet.

3. A controller for fluid pressure operated devices, said controller comprising; body structure defining a cylindrical chamber; a cylindrical primary valve element journalled in said body structure and extending axially within said chamber; a tubular follow-up valve element concentrically journalled on said primary valve element within said chamber; means for imparting rotation to said primary valve element from a neutral position; means coupling said valve elements together for independent rotation relative to each other between predetermined limits and for common rotation; said body structure defining, an inlet for connection to a source of fluid under pressure, an outlet for return of fluid to said source, and a pair of fluid ports for connection to a fluid pressure operated device; said body structure including a stationary annular internally toothed member concentric with said chamber; an externally toothed member having a less number of teeth than said internally toothed member and mounted in meshing engagement therewith for orbital and rotary movements within said internally toothed member; said toothed members cooperating to provide a servomotor; means coupling said externally toothed member to said follow-up valve element for common rotation therewith; said body structure defining fluid passages communicating with said servomotor; said valve elements each having valve passages which cooperate to direct flow of fluid from said inlet through said servomotor to one of said ports and to direct flow of fluid from the other of said ports to said outlet responsive to rotation of said primary valve element in one direction away from said neutral position relative to said follow-up valve element; rotation of said primary valve element in the opposite direction from said neutral position causing said valve element passages to be disposed to direct flow of fluid from said inlet through said servomotor to the other of said ports and to direct the flow of fluid from said one of the ports to said outlet; the arrangement being such that the entire stream of fluid flowing from said inlet to the selected one of said ports is conducted through said servomotor; said valve elements in said neutral position relative to each other cutting off the flow of fluid to said servomotor.

4. The structure defined in claim 3 in which said body structure further defines an auxiliary fluid passage between said inlet and outlet independently of the others of said passages, and in further combination with a valve normally closing said auxiliary passage when the inlet pressure is greater than the outlet pressure and opening said auxiliary passage during reversal of said pressure to permit flow of fluid from said outlet to said inlet through said auxiliary passage.

5. The structure defined in claim 3 in which said primary valve element defines an axial recess extending from one end of said primary valve element for the greater part of its length, said means coupling the valve elements together comprising a transverse drive pin connected at its opposite end portions to diametrically opposed portions of said follow-up valve element, said primary valve element having diametrically opposed circumferentially extending slots for free reception of said drive pin, the opposite ends of said slots engaging said drive pin to limit said independent movement of the primary valve element.

6. The structure defined in claim 5 in which said means coupling the externally toothed member to said follow-up valve element comprises a drive shaft connected at one end to said externally toothed member for common rotation therewith and for angular movements with respect thereto, the other end of said drive shaft being bifurcated for reception of the intermediate portion of said drive pin within said recess in the primary valve element.

7. The structure defined in claim 6 in further combination with spring means yieldingly urging one of said valve elements in a direction of rotation relative to the other of said valve elements to center said drive pin between said opposite ends of said slots in the primary valve element and dispose said primary valve element in said neutral position relative to the follow-up valve element.

8. A controller for fluid pressure operated devices, said controller comprising; valve structure including a primary movable valve element and a cooperating movable follow-up valve element; means for connecting said primary valve element to a control element for common movements therewith; and a fluid servomotor including a rotary member coupled to said follow-up element for imparting follow-up movements thereto responsive to rotation of said rotary member; said valve structure defining, an inlet for connection to a source of fluid under pressure and an outlet for return of fluid to said source, a pair of fluid ports for connection to a fluid pressure operated device, and fluid passages communicating with said servomotor; said valve elements each having valve passages which cooperate to direct flow of fluid from said inlet through said servomotor to one of said ports and to direct flow of fluid from the other of said ports to said outlet responsive to movement of said primary valve element in one direction away from a neutral position relative to said follow-up valve element; movement of said primary valve element in the opposite direction from said neutral position causing said valve element passages to be disposed to direct flow of fluid from said inlet through said servomotor to the other of said ports and to direct flow of fluid from said one of the ports to said outlet; the arrangement being such that the entire stream of fluid flowing from said inlet to the selected one of said ports is conducted through said servomotor; said valve elements in said neutral position relative to each other cutting off the flow of fluid to said servomotor.

9. A controller for fluid pressure operated devices, said controller comprising; valve structure including a primary movable valve element and a cooperating movable follow-up valve element; means for connecting said primary valve element to a control element for common movement therewith in either direction from a neutral position; means coupling said primary valve element to said follow-up valve element for limited movements independently of said follow-up valve element and for common movements therewith and including a resilient member yieldingly urging said valve elements toward relative neutral positions wherein said primary valve element is disposed centrally between the limits of said independent movement thereof relative to said follow-up valve element; and a fluid servomotor including a movable member coupled to said follow-up element for imparting follow-up movements thereto responsive to movement of said movable member; said valve structure defining, an inlet for connection to a source of fluid under pressure and an outlet for return of fluid to said source, a pair of fluid ports for connection to a fluid pressure operated device, and fluid passages communicating with said servomotor; said valve elements each having valve passages which cooperate to direct flow of fluid from said inlet through said servomotor to one of said ports and to direct flow of fluid from the other of said ports to said outlet responsive to movement of said primary valve element in one direction away from said neutral position relative to said follow-up valve element; movement of said primary valve element in the opposite direction from said neutral position causing said valve element passages to be disposed to direct flow of fluid from said inlet through said servomotor to the other of said ports and to direct the flow of fluid from said one of the ports to said outlet; the arrangement being such that the entire stream of fluid flowing from said inlet to the selected one of said ports is conducted through said servomotor; said valve elements in said neutral position relative to each other cutting off the flow of fluid to said servomotor.

10. In combination with a fluid pressure operated device and a source of fluid under pressure therefor, a controller comprising; valve structure including a primary movable valve element and a cooperating movable follow-up valve element; means for connecting said primary valve element to a control element for common movement therewith; means coupling said primary valve element to said follow-up valve element for limited movements independently of said follow-up valve element and for common movements therewith; and a fluid servomotor including, a movable member coupled to said follow-up valve element for imparting follow-up movements thereto responsive to movement of said movable member; said valve structure defining, an inlet connected to said source of fluid and an outlet connected to said source for return of fluid thereto, a pair of ports connected to said fluid pressure operated device, and fluid passages communicating with said servomotor; said valve elements each having valve passages which cooperate to direct flow of fluid from said inlet through said servomotor to one of said ports and to direct flow of fluid from the other of said ports to said outlet responsive to movement of said primary valve element in one direction away from a neutral position relative to said follow-up valve element; movement of said primary valve element in the opposite direction from said neutral position causing said valve element passages to be disposed to direct flow of fluid from said inlet through said servomotor to the other of said ports and to direct the flow of fluid from said one of the ports to said outlet; the arrangement being such that the entire stream of fluid flowing from said inlet to the selected one of said ports is conducted through said servomotor; said valve elements in said neutral position relative to each other cutting off the flow of fluid to said servomotor.

11. A controller for fluid pressure operated devices, said controller comprising; body structure defining a cylindrical chamber; a cylindrical primary valve element journalled in said body structure and extending axially within said chamber; a tubular follow-up valve element concentrically journalled on said primary valve element within said chamber; means for imparting rotation to said primary valve element from a neutral position; means coupling said valve elements together for independent rotation relative to each other between pre-determined limits and for common rotation; said body structure defining an inlet for connection to a source of fluid under pressure, an outlet for return of fluid to said source, and a pair of fluid ports for connection to a fluid pressure operated device; and a servomotor comprising an internally toothed member and an externally toothed member; said externally toothed member having a less number of teeth than said internally toothed member and in meshing engagement therewith; one of said members being stationary and the other thereof being movable in an orbit about the axis of the stationary member and rotatable on its own axis responsive to said orbital movement; said follow-up valve element being coupled to said movable member for common rotation therewith; said body structure defining fluid passages communicating with said servomotor; said valve elements each having valve passages which cooperate to direct flow of fluid from said inlet through said servomotor to one of said ports and to direct flow of fluid from the other of said ports to said outlet responsive to rotation of said primary valve element in one direction away from said neutral position relative to said follow-up valve element; rotation of said primary valve element in the opposite direction from said neutral position causing said valve element passages to be disposed to direct flow of fluid from said inlet through said servomotor to the other of said ports and to direct the flow of fluid from said one of the ports to said outlet; the arrangement being such that the entire stream of fluid flowing from said inlet to the selected one of said ports is conducted through said servomotor; said valve elements in said neutral position relative to each other cutting off the flow of fluid to said servomotor.

12. A controller for fluid pressure operated devices, said controller comprising; body structure defining a cylindrical chamber; a cylindrical primary valve element journalled in said body structure and extending axially within said chamber; a tubular follow-up valve element concentrically journalled on said primary valve element within said chamber; means for imparting rotation to said primary valve element from a neutral position relative to said follow-up valve element; means coupling said valve elements together for independent rotation relative to each other between predetermined limits and for common rotation and including a resilient member yieldingly urging said valve elements toward relative neutral positions wherein said primary valve element is disposed centrally between the limits of said independent rotation thereof; said body structure defining an inlet for connection to a source of fluid under pressure, an outlet for return of fluid to said source and a pair of fluid ports for connection to a fluid pressure operated device; and a servomotor comprising an internally toothed member and an externally toothed member; said externally toothed member having a less number of teeth than said internally toothed member and in meshing engagement therewith; one of said members being stationary and the other thereof being movable in an orbit about the axis of the stationary member and rotatable on its own axis responsive to said orbital movement; said follow-up valve element being coupled to said movable member for common rotation therewith; said body structure defining fluid passages communicating with said servomotor; said valve elements each having valve passages which cooperate to direct flow of fluid from said inlet through said servomotor to one of said ports and to direct flow of fluid from the other of said ports to said outlet responsive to rotation of said primary valve element in one direction away from said neutral position relative to said follow-up valve element; rotation of said primary valve element in the opposite direction from said neutral position causing said valve element passages to be disposed to direct flow of fluid from said inlet through said servomotor to the other of said ports and to direct flow of fluid from said one of the ports to said outlet; the arrangement being such that the entire stream of fluid flowing from said inlet to the selected one of said ports is conducted through said servomotor; said valve elements in said neutral position relative to each other cutting off the flow of fluid to said servomotor.

References Cited in the file of this patent

UNITED STATES PATENTS

| | | |
|---|---|---|
| 2,105,473 | Dean | Jan. 18, 1938 |
| 2,261,444 | Neubert | Nov. 4, 1941 |
| 2,524,055 | Hubert | Oct. 3, 1950 |
| 2,688,258 | Haynes et al. | Sept. 7, 1954 |
| 2,786,539 | Nichols | Mar. 26, 1957 |
| 2,821,171 | Charlson | Jan. 28, 1958 |